(12) United States Patent
Lin et al.

(10) Patent No.: US 9,954,881 B1
(45) Date of Patent: *Apr. 24, 2018

(54) ATO THREAT VISUALIZATION SYSTEM

(71) Applicant: Microsoft Technology Licensing, LLC, Redmond, WA (US)

(72) Inventors: Ziliang Lin, Menlo Park, CA (US); Xiaosu Huang, Sunnyvale, CA (US); Sakshi Ratneshchand Jain, Mountain View, CA (US); Theodore Hwa, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

This patent is subject to a terminal disclaimer.

(21) Appl. No.: 15/083,738

(22) Filed: Mar. 29, 2016

(51) Int. Cl.
*G06F 12/14* (2006.01)
*G06F 12/16* (2006.01)
*H04L 29/06* (2006.01)
*H04L 29/08* (2006.01)

(52) U.S. Cl.
CPC .......... *H04L 63/1425* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 9,871,806 B2* | 1/2018 | Sohn | H04L 63/1408 |
| 2006/0140127 A1* | 6/2006 | Lee | H04L 43/18 370/241 |
| 2011/0277034 A1* | 11/2011 | Hanson | G06F 21/554 726/25 |
| 2017/0272454 A1* | 9/2017 | Seo | H04L 63/1416 |

* cited by examiner

*Primary Examiner* — Fatoumata Traore
(74) *Attorney, Agent, or Firm* — Schwegman Lundberg & Woessner, P.A.

(57) ABSTRACT

An Account Takeover (ATO) detection system is configured to generate a visualization of the monitored login attempts during a time period with respect to an on-line service. In the visualization, a login attempt from an IP address is presented as an object in a three-dimensional coordinates system. This three-dimensional coordinates system has the first axis representing the first octet of an IP address, the second axis representing the second octet of an IP address, and the third axis representing the third and the fourth octets of the IP address.

18 Claims, 8 Drawing Sheets

ATO THREAT VISUALIZATION SYSTEM

TECHNICAL FIELD

This application relates to the technical fields of software and/or hardware technology and, in one example embodiment, to system and method to detect and visualize ATO threats within an on-line social network system.

BACKGROUND

Account takeover (ATO) occurs when someone other than the authorized account holder gains access to that account data. A fraudster who takes over another person's account may cause damage by, e.g., changing the information in the profile of the legitimate owner, requesting money from the connections of the legitimate owner, sending out unauthorized invitations and spam, etc.

In order to detect and possibly prevent ATO, a defence system may be configured to automatically challenge suspicious login attempts with, e.g., using CAPTCHA (Completely Automated Public Turing test to tell Computers and Humans Apart). One approach to detecting suspicious login attempts is to set a limit to the number of times that a login request originating from a certain IP address is accepted for processing during a period of time. For example, if the limit has been set to 1000 attempts during one hour, and if one thousand attempts has already been detected during one hour from the same IP address, a defence system may flag that IP address as a potential source of fraud and may automatically block any further login attempts from that IP address.

An IP address (Internet Protocol address) is used to identify computers on the Internet. An IP address is a 32-bit number subdivided into four bytes (four groups of eight bits or octets). The last number in the in IP address, e.g., number 155 in the IP address 204.132.40.155, is referred as the first octet for the purposes of this description. The binary equivalent of the IP address 204.132.40.155 is 11001100.10000100.00101000.10011011, its first octet is 10011011 An IP address is usually based on a real-world geographic location.

One example of a web-based service that may be subject to the threat of ATO is an on-line social network. An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a social networking web site may emphasize employment history and education of the associated member.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
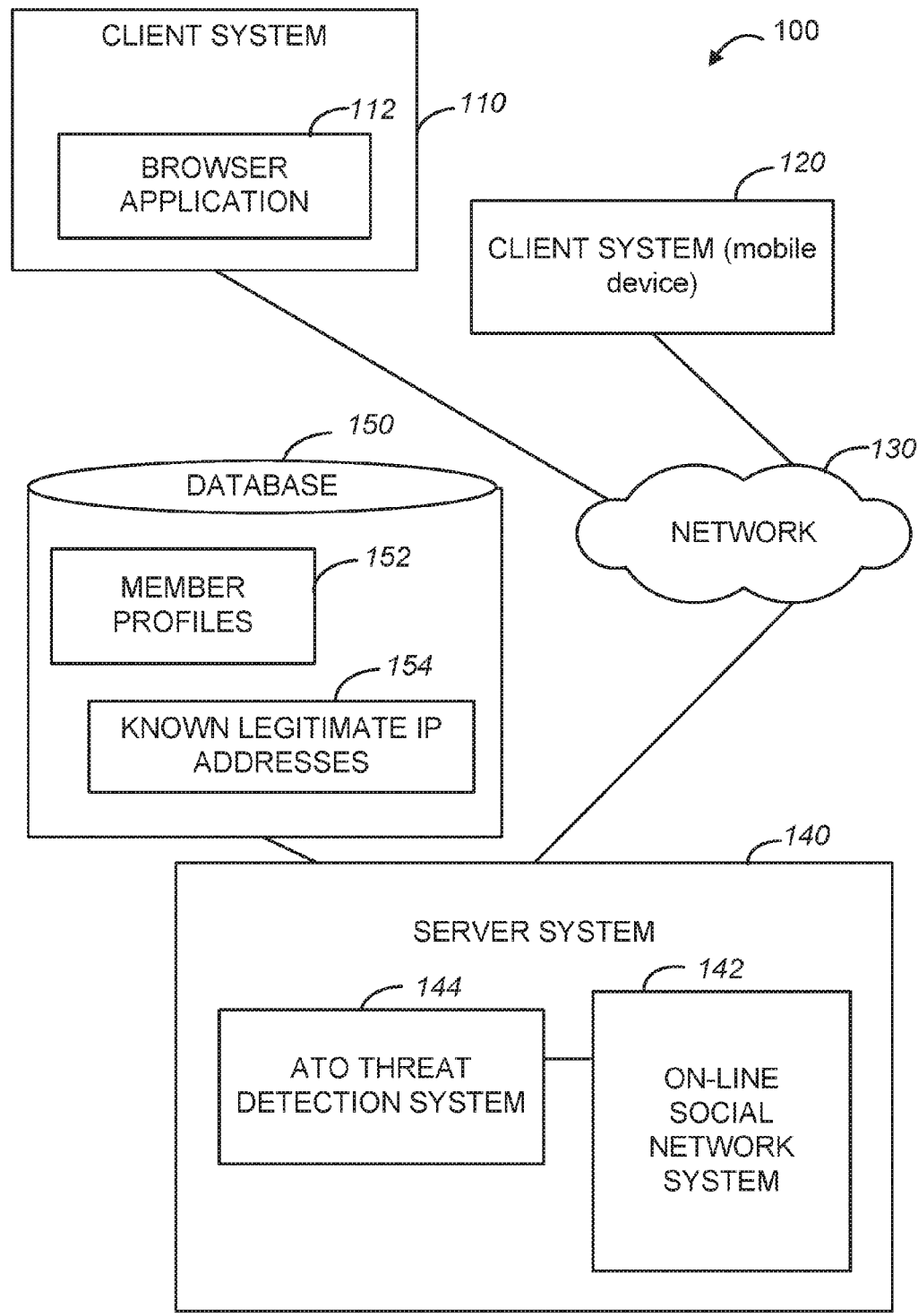
FIG. 1 is a diagrammatic representation of a network environment within which an example method and system to detect ATO threats in an on-line environment may be implemented.

In the following description, for purposes of explanation, numerous specific details are set forth in order to provide a thorough understanding of an embodiment of the present invention. It will be evident, however, to one skilled in the art that the present invention may be practiced without these specific details. As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention. One example of a web-based service that may be subject to the threat of ATO is an on-line social network implemented as an on-line social networking application.

A defense system for preventing ATOs may be configured to automatically detect suspicious login attempts by setting a limit to how many login attempts from the same IP address are permitted during a predetermined period of time before a login request from that IP address is no longer accepted for processing. For example, if the limit has been set to 1000 attempts during one hour, and if one thousand attempts has already been detected during one hour from the same IP address, a defense system may flag that IP address as a potential source of fraud and may automatically block any further login attempts from that IP address.

An ATO threat detection system is provided to detect potentially malicious activity when an attacker/fraudster uses multiple IP addresses for multiple login attempts. In some cases, login attempts perpetrated by a malicious entity may originate from a block of IP addresses, where these IP addresses differ in the first octet (i.e., in the last number from the group of four numbers that constitute an IP address), while some attackers may use IP addresses that differ in the first and also in the second octet (i.e., in the last two numbers from the group of four numbers that constitute an IP address). In one example embodiment, an ATO threat detection system is configured to detect that a group of IP addresses is a suspected group of IP addresses (in that there is an indication that same potentially malicious entity is using a group of IP addresses to attempt logins) and automatically select a lower value that limits how many login attempts from the same IP address are permitted during a predetermined period of time before a login request from the suspected group of IP address is no longer accepted for processing. The limit that is used to restrict login attempts from a single IP address is referred to as a solo threshold value. The limit that is used to restrict login attempts from a group of IP addresses is referred to as a group threshold value. As stated above, a group threshold value is set to be lower than a solo threshold value.

In one embodiment, an ATO threat detection system monitors login attempts with respect to an on-line service. Every time a login is requested, the ATO threat detection system compares the number of login attempts during a target period of time (e.g., the last hour) from the subject IP address that originated the request and, if that number is greater than or equal to the solo threshold value, denies the request and restricts further login attempts from that subject IP address. The ATO threat detection system may optionally generate a notification regarding this restriction and cause presentation of the notification on a display device of a computer system associated with the subject IP address. If the number of login attempts during the target period of time is less than the solo threshold value, the ATO threat detection system determines whether there is an indication that the subject IP address is from a group of suspected IP addresses. In order to make such determination, the ATO threat detection system determines whether the sum of the number of login attempts from the subject IP address and the number of login attempts during the target period of time and with respect to the same on-line service from IP addresses that differ from the subject IP address only in the first octet is at or above a group threshold value. If not, the login attempt is permitted to be processed; otherwise, the request is denied and any further login attempts from that entire group of IP addresses are restricted.

An ATO defense system may be configured to recognize that a malicious user is rotation not just the first but the first and the second octets of an IP address. In some embodiments, the ATO threat detection system determines whether the sum of the number of login attempts from the subject IP address and the number of login attempts during the target period of time and with respect to the same on-line service from IP addresses that differ from the subject IP address in the first and/or second octet is at or above a group threshold value. If not, the login attempt is permitted to be processed; otherwise, the request is denied and any further login attempts from that entire group of IP addresses are restricted.

In order to reduce the possibility of restricting a legitimate IP address from accessing an on-line service, e.g., when a legitimate IP address has the same last three octets as a block of IP addresses utilized by a malicious user, an ATO threat detection system may generate and maintain a list of legitimate IP addresses, which could be, e.g., IP addresses of registered members of the on-line service or, e.g., known legitimate IP addresses associated with certain known legitimate businesses. When the ATO threat detection system determines that the sum of the number of login attempts from the subject IP address and the number of login attempts during the target period of time and with respect to the same on-line service from IP addresses that differ from the subject IP address only in the first octet is at or above a group threshold value, the ATO threat detection system restricts further login attempts from that entire group of IP addresses, except for those IP addresses that have been whitelisted (i.e. appear in a list of known legitimate IP addresses).

In one embodiment, an ATO threat detection system is configured to generate a visualization of the monitored login attempts during a time period with respect to the on-line service. In the visualization, a login attempt from an IP address is presented as an object in a three-dimensional coordinates system. This three-dimensional coordinates system has the first axis representing the first octet of an IP address, the second axis representing the second octet of an IP address, and the third axis representing the third and the fourth octets of the IP address. An example three-dimensional coordinates system used to represent login attempts from IP addresses is shown as a presentation 500 in FIG. 5.

Figure 5:
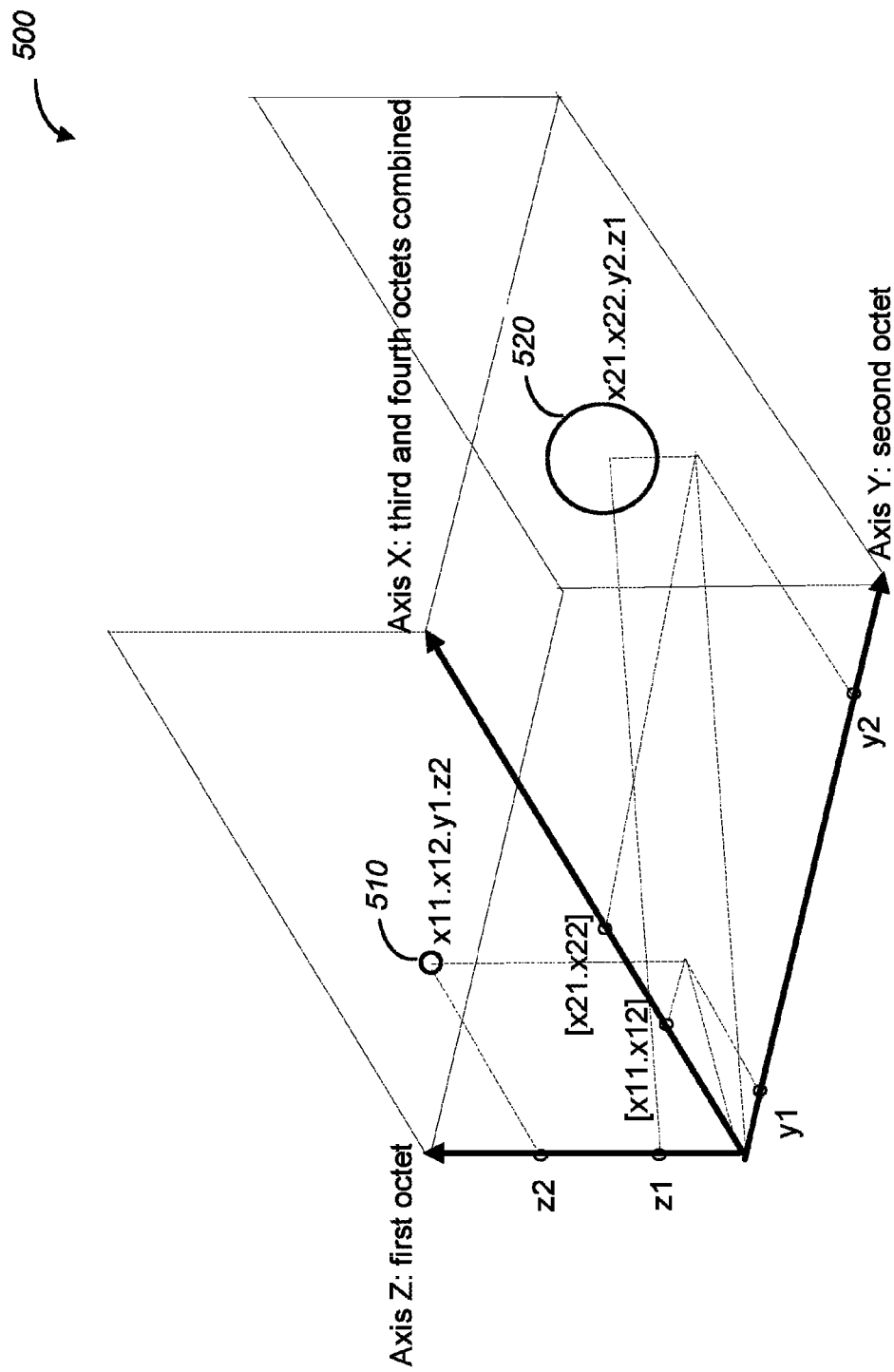
FIG. 5 is a representation of a visualization of login attempts originating from various IP addresses, in accordance with an example embodiment.

As shown in FIG. 5, the vertical axis (Z) represents the first octet of an IP address, the second axis (Y) represents the second octet of an IP address, and the third axis (X) representing a combination of the third and the fourth octets of the IP address. An object 510 represents login attempts during a target period of time (e.g., the last hour) from the IP address x11.x12.yl.z1. An object 520 represents login attempts during a target period of time (e.g., the last hour) from the IP address x21.X22.y2.z2. Multiple login attempts from the same IP address during a time period can be represented in a three-dimensional coordinates system as a circle or a sphere. The radius of a circle or a sphere representing multiple login attempts from the same IP address during a time period is indicative of the number of login attempts during the time period. In FIG. 5, the object 520 has a greater radius than the object 510, which indicates that there have been detected greater number login attempts from the IP address x21.x22.y2.z2 than from the IP address x21.x22.y2.z2.

Figure 6:
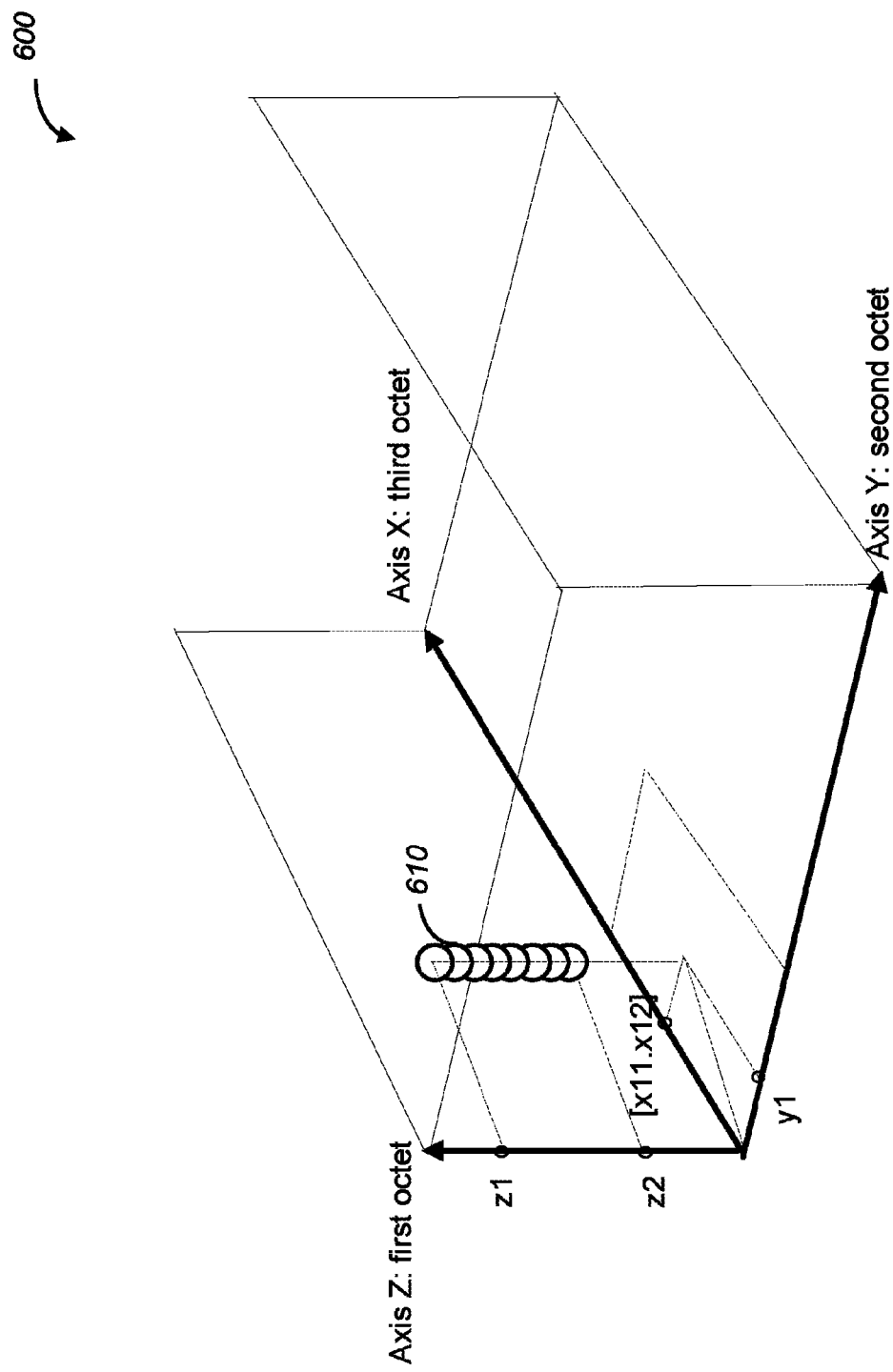
FIG. 6 is another representation of a visualization of login attempts originating from various IP addresses, in accordance with an example embodiment.

Another example (presentation 600) of representing login attempts from IP addresses in a three-dimensional coordinates system is shown in FIG. 6. In FIG. 6, a number of login attempts from IP addresses that differ from each other only in the first octet are represented as a vertical cluster 610. The vertical cluster 610 may be visually highlighted in the presentation 600, which may be beneficial, e.g., if many other login attempts from various IP addresses are also being represented in the same visualization.

Figure 7:
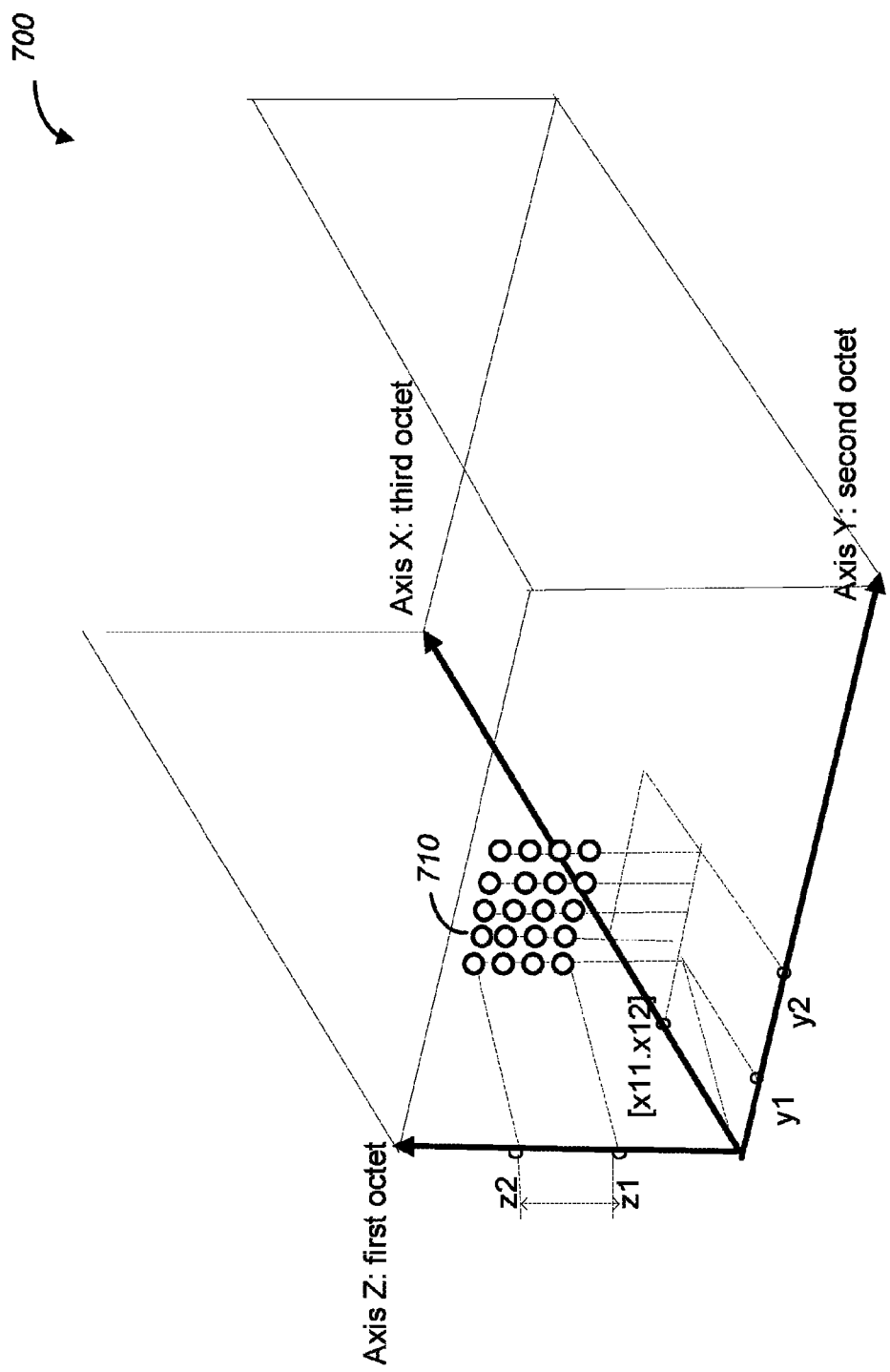
FIG. 7 is yet another representation of a visualization of login attempts originating from various IP addresses, in accordance with an example embodiment.

Yet another example (presentation 700) of representing login attempts from IP addresses in a three-dimensional coordinates system is shown in FIG. 7. In FIG. 6, a number of login attempts from IP addresses that differ from each other in the first and/or second octet are represented as a cluster 710. The login attempts represented by the cluster 710 all originate from IP addresses that have the same third and fourth octets (here, [x11.x12]). An example ATO threat detection system may be implemented in the context of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152. The database 150 also stores a list of known legitimate IP addresses 154. It will be noted that, in some embodiments, the database 150 is considered to be part of the on-line social network system 142.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts an ATO threat detection system 144. It will be noted that, in some embodiments, the ATO threat detection system 144 is considered to be part of the on-line social network system 142.

The ATO threat detection system 144 may be configured to detect that a group of IP addresses is a suspected group of IP addresses (in that there is an indication that same potentially malicious entity is using a group of IP addresses to attempt logins) and automatically select a lower value that limits how many login attempts from the same IP address are permitted during a predetermined period of time before a login request from the suspected group of IP address is no longer accepted for processing. The ATO threat detection system 144 may also, or instead, be configured to generate a visualization of the monitored login attempts during a time period with respect to an on-line service. As described above, in the visualization, a login attempt from an IP address is presented as an object in a three-dimensional coordinates system. This three-dimensional coordinates system has the first axis representing the first octet of an IP address, the second axis representing the second octet of an IP address, and the third axis representing the third and the fourth octets of the IP address. It will be noted that the ATO threat detection system 144 may be configured to perform either the ATO detection described above or the visualization of login attempts described above, or both of these methodologies. An example ATO threat detection system 144 is illustrated in FIG. 2.

Figure 2:
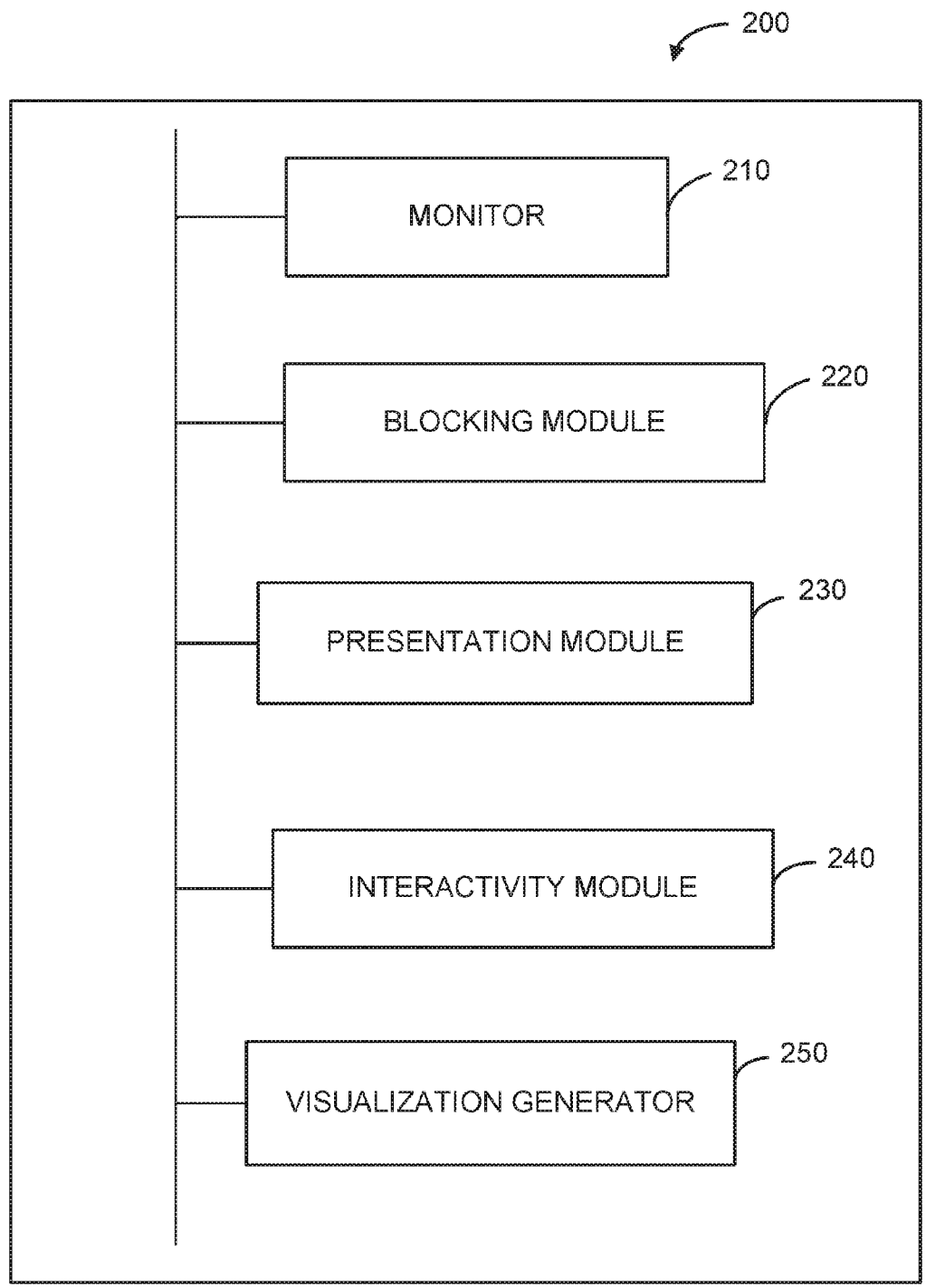
FIG. 2 is block diagram of a system to detect ATO threats in an on-line environment, in accordance with one example embodiment.

FIG. 2 is a block diagram of a system 200 to detect and/or visualize ATO threats in the on-line social network system 142 of FIG. 1. The system 200 corresponds to the ATO threat detection system 144 of FIG. 1. As shown in FIG. 2, the system 200 includes a monitor 210, a blocking module 220, a presentation module 230, an interactivity module 240, and a visualization module 250.

The monitor 210 is configured to monitor login attempts with respect to an on-line service, e.g., with respect to the on-line social network system 142 of FIG. 1. The login attempts originate from various IP addresses. The blocking module 220 is configured to access a first count indicating a number of login attempts during a time period with respect to the on-line service originating from a target IP address, access a second count indicating a number of login attempts during the time period with respect to the on-line service originating from one or more IP addresses that differ from the target IP address only in the first octet, and, based on the sum of the first count and the second count, selectively restrict the login attempt. The presentation module 230 is configured to generate presentations and cause displaying of the generated presentations on a display device. For example, the presentation module 230 may generate a presentation notifying a user associated with the target IP address that the login request is rejected and to cause displaying of the presentation on a display device of the user. The presentation module 230 may generate such notification presentation by modifying a login web page associated with the on-line service.

As mentioned above, an IP address is usually based on a real-world geographic location. The interactivity module 250 may be configured to detect a hover event on a display device associated with a presentation of an object in the visualization of login attempts from various IP addresses, determine an IP address represented by the object, access geographical data associated with the IP address and cause displaying, on the display device, information regarding the geographic location associated with the IP address represented by the object. Some operations performed by the system 200 to detect ATO threats may be described with reference to FIG. 3.

Figure 3:
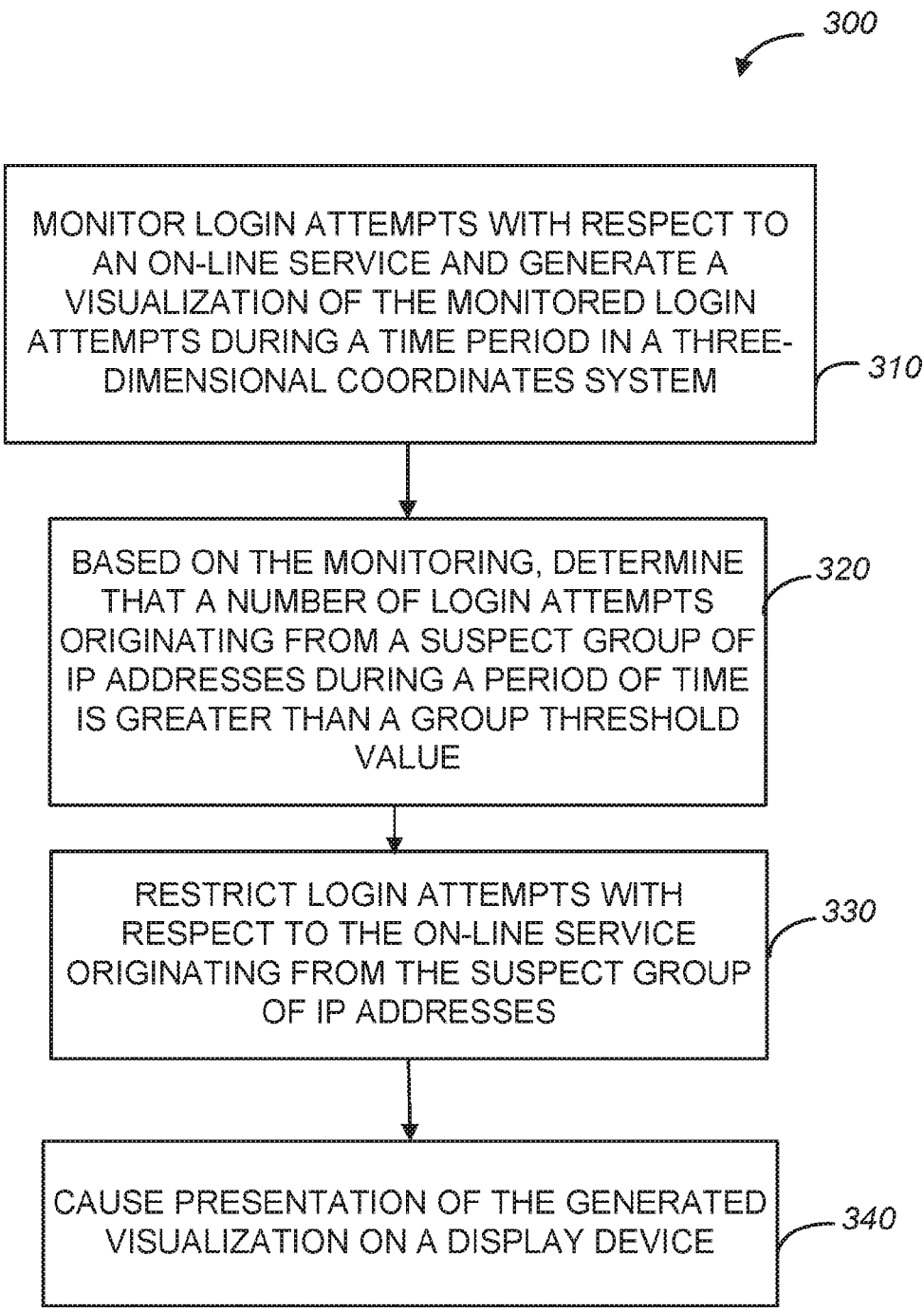
FIG. 3 is a flow chart illustrating a method to detect ATO threats in an on-line environment, in accordance with an example embodiment.

FIG. 3 is a flow chart of a method 300 to detect ATO threats in an on-line social network system 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the monitor 210 of FIG. 2 detects a login attempt with respect to an on-line service from a target IP address. At operation 320, the blocking module 220 of FIG. 2 accesses a first count indicating a number of login attempts during a time period with respect to the on-line service originating from a target IP address, accesses a second count indicating a number of login attempts during the time period with respect to the on-line service originating from one or more IP addresses that differ from the target IP address only in the first octet, and, based on the sum of the first count and the second count, selectively restricts the login attempt at operation 330. At operation 340, the presentation module 230 of FIG. 2 generates a presentation notifying a user associated with the target IP address that the login request is rejected and causes displaying of the presentation on a display device of the user.

Figure 4:
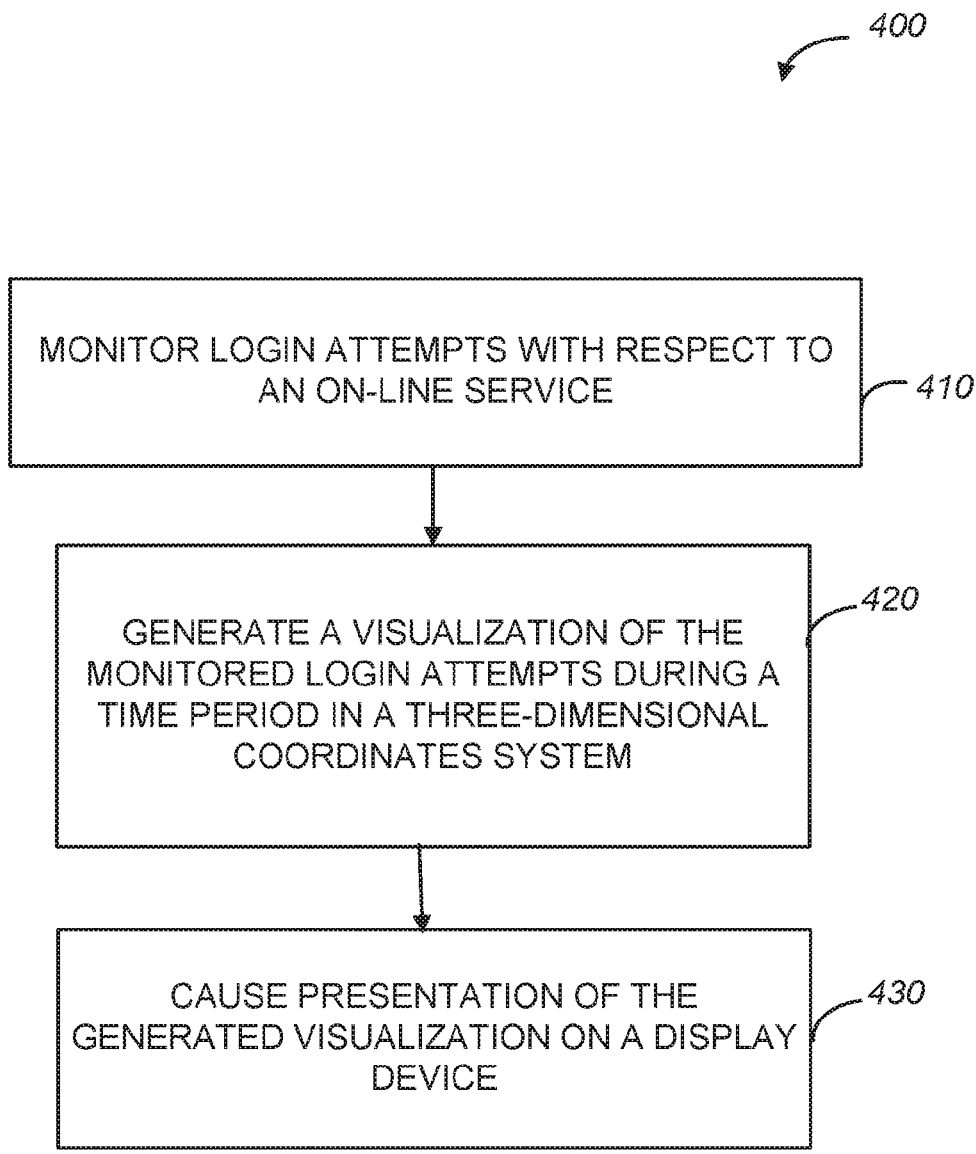
FIG. 4 is a flow chart illustrating a method to visualize login attempts originating from various IP addresses.

Returning to FIG. 2, also shown in FIG. 4 is the visualization module 250. The visualization generator 250 is configured to generate a visualization of the monitored login attempts during a time period with respect to the on-line service. The visualization presents a login attempt from an IP address as an object in a three-dimensional coordinates system that has the first axis representing the first octet of an IP address, the second axis representing the second octet of an IP address, and the third axis representing the third and the fourth octets of the IP address. Some example visualizations of login attempts from various IP addresses are illustrated in and discussed with respect to FIG. 5, FIG. 6, and FIG. 7. The visualization generator 250 may be configured to visually highlight, in the three-dimensional coordinates system, representations of login attempts originating from a suspected group of IP addresses. A group of IP addresses that differ only in the first octet is identified as a suspected group of addresses if the sum of login attempts from all such IP addresses during a certain period (e.g., during the last 90 minutes) is greater than a predetermined group threshold value, Some operations performed by the system 200 to visualize ATO threats may be described with reference to FIG. 4.

FIG. 4 is a flow chart of a method 400 to visualize ATO threats in an on-line social network system 142 of FIG. 1. The method 400 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 4, the method 400 commences at operation 410, when the monitor 210 of FIG. 2 monitors login attempts with respect to an on-line service. At operation 420, visualization generator 250 of FIG. 2 generates a visualization of the monitored login attempts during a time period with respect to the on-line service, such as, e.g., example visualizations illustrated in FIG. 5, FIG. 6, and FIG. 7, which are discussed above. At operation 430, the presentation module 230 of FIG. 2 causes presentation of the visualization generated by the visualization generator 250 on a display device.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 8:
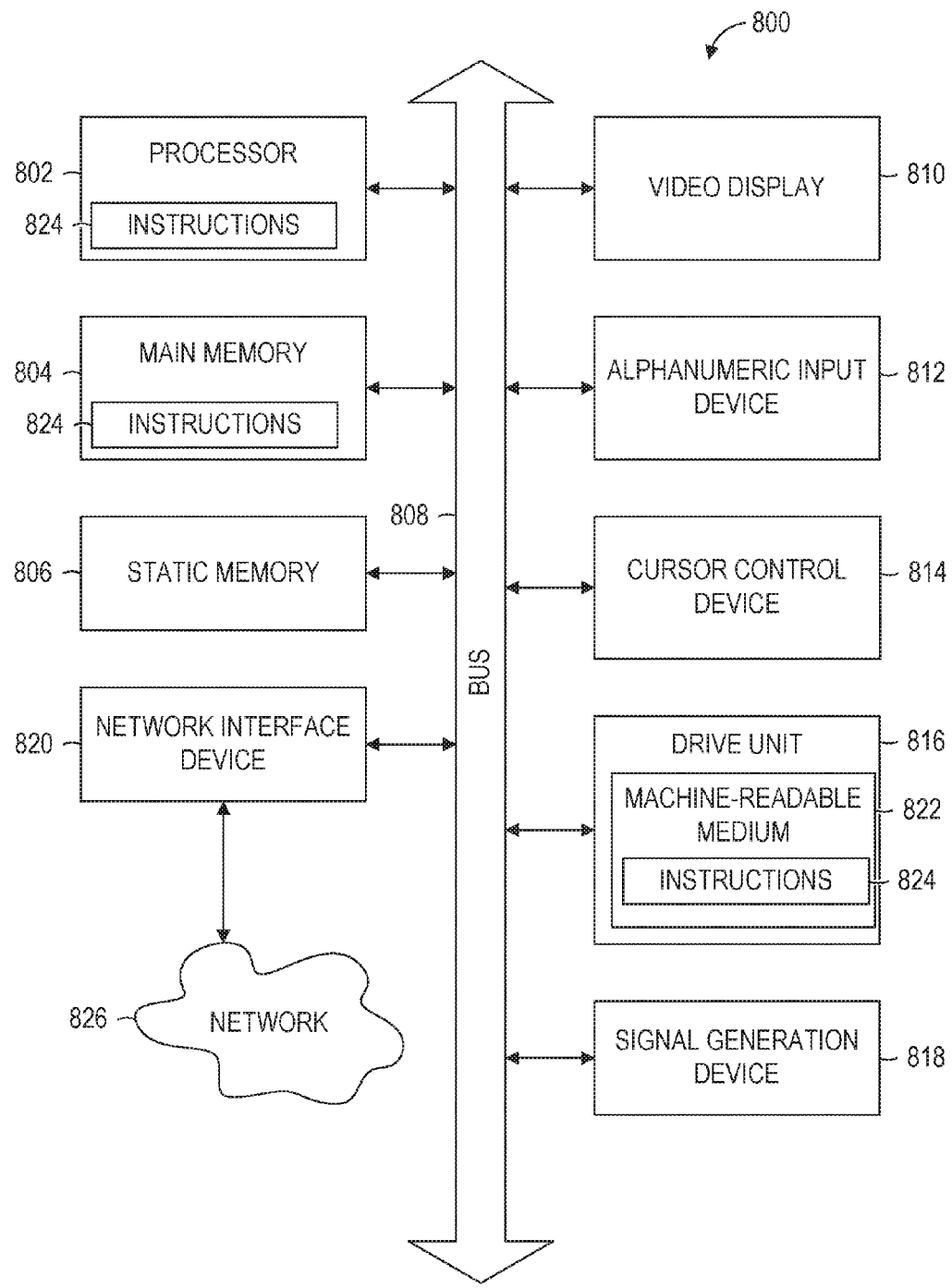
FIG. 8 is a diagrammatic representation of an example machine in the form of a computer system within which a set of instructions, for causing the machine to perform any one or more of the methodologies discussed herein, may be executed.

FIG. 8 is a diagrammatic representation of a machine in the example form of a computer system 800 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an alpha-numeric input device 812 (e.g., a keyboard), a user interface (UI) navigation device 814 (e.g., a cursor control device), a disk drive unit 816, a signal generation device 818 (e.g., a speaker) and a network interface device 820.

The disk drive unit 816 includes a machine-readable medium 822 on which is stored one or more sets of instructions and data structures (e.g., software 824) embodying or utilized by any one or more of the methodologies or functions described herein. The software 824 may also reside, completely or at least partially, within the main memory 804 and/or within the processor 802 during execution thereof by the computer system 800, with the main memory 804 and the processor 802 also constituting machine-readable media.

The software 824 may further be transmitted or received over a network 826 via the network interface device 820 utilizing any one of a number of well-known transfer protocols (e.g., Hyper Text Transfer Protocol (HTTP)).

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

MODULES, COMPONENTS AND LOGIC

Certain embodiments are described herein as including logic or a number of components, modules, or mechanisms. Modules may constitute either software modules code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to detect and/or visualize ATO threats in an on-line environment has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. The method comprising:
monitoring login attempts with respect to an on-line service;
using at least one processor, generating a visualization of the monitored login attempts during a time period with respect to the on-line service, the visualization presenting a login attempt from an IP address as an object in a three-dimensional coordinates system having the first axis representing the first octet of an IP address, the second axis representing the second octet of an IP address, and the third axis representing the third and the fourth octets of the IP address;
determining, based on the monitoring, that a number of login attempts originating from a suspected group of IP addresses during a period of time is greater than a group threshold value; and
restricting login attempts with respect to the on-line service originating from the suspected group of IP addresses.

2. The method of claim 1, causing presentation of the generated visualization on a display device.

3. The method of claim 1, comprising representing multiple login attempts from the same IP address during a time period as a circle or a sphere.

4. The method of claim 3, wherein a radius of the circle representing multiple login attempts from the same IP address during a time period is indicative of the number of login attempts during the time period.

5. The method of claim 1, wherein the first axis representing the first octet of an IP address is a vertical axis in the three-dimensional coordinates system.

6. The method of claim 1, wherein IP addresses from the suspected group of IP addresses differ only in the first octet.

7. The method of claim 1, wherein IP addresses from the suspected group of IP addresses have the same third and fourth octet and differ in both the first and the second octets.

8. The method of claim 1, wherein the generating of the visualization comprises visually highlighting, in the three-dimensional coordinates system, representations of login attempts originating from the suspected group of IP addresses.

9. The method of claim 1, wherein the generating of the visualization comprises associating an object in the three-dimensional coordinates system with functionality comprising detecting a hover event associated with a presentation of the object on a display device and, in response to the detecting, causing displaying of information regarding geographic location associated with an IP address represented by the object.

10. A computer-implemented system comprising:
   one or more processors; and
   a non-transitory computer readable storage medium comprising instructions that when executed by the one or processors cause the one or more processors to perform operations comprising:
   monitor monitoring login attempts with respect to an on-line service,
   generating a visualization of the monitored login attempts during a time period with respect to the on-line service, the visualization presenting a login attempt from an IP address as an object in a three-dimensional coordinates system having the first axis representing the first octet of an IP address, the second axis representing the second octet of an IP address, and the third axis representing the third and the fourth octets of the IP address,
   determining, based on the monitoring, that a number of login attempts originating from a suspected group of IP addresses during a period of time is greater than a group threshold value, and
   restricting login attempts with respect to the on-line service originating from the suspected group of IP addresses.

11. The system of claim 10, comprising causing presentation of the generated visualization on a display device.

12. The system of claim 10, comprising representing multiple login attempts from the same IP address during a time period as a circle or a sphere.

13. The system of claim 12, wherein a radius of the circle representing multiple login attempts from the same IP address during a time period is indicative of the number of login attempts during the time period.

14. The system of claim 10, wherein the first axis representing the first octet of an IP address is a vertical axis in the three-dimensional coordinates system.

15. The system of claim 10, wherein IP addresses from the suspected group of IP addresses differ only in the first octet.

16. The system of claim 10, wherein IP addresses from the suspected group of IP addresses have the same third and fourth octet and differ in both the first and the second octets.

17. The system of claim 10, comprising visually highlighting, in the three-dimensional coordinates system, representations of login attempts originating from the suspected group of IP addresses.

18. A machine-readable non-transitory storage medium having instruction data executable by a machine to cause the machine to perform operations comprising:
   monitoring login attempts with respect to an on-line service;
   generating a visualization of the monitored login attempts during a time period with respect to the on-line service, the visualization presenting a login attempt from an IP address as an object in a three-dimensional coordinates system having the first axis representing the first octet of an IP address, the second axis representing the second octet of an IP address, and the third axis representing the third and the fourth octets of the IP address;
   determining, based on the monitoring, that a number of login attempts originating from a suspected group of IP addresses during a period of time is greater than a group threshold value: and
   restricting login attempts with respect to the on-line service originating from the suspected group of IP addresses.

* * * * *

UNITED STATES PATENT AND TRADEMARK OFFICE
CERTIFICATE OF CORRECTION

PATENT NO. : 9,954,881 B1
APPLICATION NO. : 15/083738
DATED : April 24, 2018
INVENTOR(S) : Lin et al.

Page 1 of 1

It is certified that error appears in the above-identified patent and that said Letters Patent is hereby corrected as shown below:

In the Claims

In Column 11, Line 15, in Claim 10, before "processors", insert --more--

In Column 11, Line 17, in Claim 10, before "monitoring", delete "monitor"

Signed and Sealed this
Thirteenth Day of August, 2019

Andrei Iancu
*Director of the United States Patent and Trademark Office*